United States Patent

Flores et al.

[15] 3,668,658

[45] June 6, 1972

[54] MAGNETIC RECORD DISK COVER

[72] Inventors: Ralph Flores, San Jose; Herbert E. Thompson, Santa Clara, both of Calif.

[73] Assignee: International Business Machines Corporation, Armonk, N.Y.

[22] Filed: Dec. 22, 1969

[21] Appl. No.: 887,017

[52] U.S. Cl. ................340/174.1 C, 179/100.2 Z, 206/62 P, 274/47

[51] Int. Cl. .................G11b 5/82, G11b 23/02, G11b 25/04

[58] Field of Search ..............................340/174.1 C; 274/47; 179/100.2 Z; 206/62 P

[56] References Cited

UNITED STATES PATENTS 3,416,150 12/1968 Lindberg.........................179/100.2 Z 2,977,127 3/1961 Mertes....................................274/47

*Primary Examiner*—Bernard Konick

*Assistant Examiner*—J. Russell Goudeau

*Attorney*—Hanifin and Jancin and Nathan N. Kallman

[57] ABSTRACT

In a magnetic recording system, the combination comprising a rotary magnetic record disk and a cover for containing the disk. The cover has its inner surfaces in frictional contact with the adjacent surfaces of the disk. Furthermore, the disk is rotatable while the cover is maintained stationary in the magnetic recording system. The cover includes means for cleaning the surface of the disk during rotation of the disk.

7 Claims, 2 Drawing Figures

MAGNETIC RECORD DISK COVER

BACKGROUND OF INVENTION

1. Field of the Invention

This invention relates to an improvement in packaging a magnetic record disk and, more particularly, to the combination of a magnetic record disk and a cover for containing the disk, the cover having the inner surfaces thereof in frictional contact with the adjacent surfaces of the disk so that the disk surfaces are cleaned whenever a relative rotation occurs between the disk and the cover.

2. Description of Prior Art

Recent computer storage information systems have made use of disks on which information is stored in a matter analogous to the recording, or storage, of sound on phonograph record disks. The information that is stored on the magnetic record surface of the disk may be retrieved by merely contacting the record surface with an appropriate magnetic transducer.

With the use of disks as with the use of magnetic tape, it has been found that dust and other particles can easily disrupt the flow of information from the disk. It is well known that this misreading of information or "drop out" is one of the serious problems encountered in transmitting information from disks into a computer.

To counteract "drop out," disk containers have been utilized. These containers are adapted to receive one or more disks on a central hub to provide an air-tight, dust-proof seal. When the disks are not being used in the magnetic recording system, they are stored in these closed containers. When it is deemed desirable to use the disks with a computer, the bottom portion of the container cover is removed; and the top part of the cover with the disk still mounted within the interior of the container is merely coupled with the drive. The present invention is adapted for use in a direct access read-only file. A magnetic record disk within the file is used to transfer information to computers and storage control systems, and more specifically, for loading an initial control program, and as a microprogram storage backup and a diagnostic microprogram storage.

The above-mentioned magnetic record disk, like all magnetic storing components, is subject to "drop out." It is highly desirable to maintain the record surface as "drop-out" free as possible. This desired result may be achieved by (1) keeping dust and other contaminants or particles from settling on the magnetic record surface, (2) cleaning any contaminant that may be present from the magnetic record surface, and (3) protecting the magnetic record surface from being subjected to contamination during handling operations. A cover producing these desired results and which additionally is rugged, inexpensive and mailable is the subject matter of this invention.

SUMMARY OF THE INVENTION

It is an object of this invention to provide in a magnetic recording system, the combination comprising a rotary magnetic record disk and a cover for containing the disk, having the inner surfaces thereof in frictional contact with the adjacent surfaces of the disk, the disk being rotatable while the cover is maintained stationary in the magnetic recording system.

In accordance with the preceding object, it is still another object of the invention to provide means coupled to the disk for rotating the disk.

It is still another object in connection with the foregoing objects to provide that the perimeter of the cover be sealed therearound, thereby to enclose the disk nonremovably therefrom.

Still a further object in accordance with the preceding objects of this invention is to provide a cover which comprises a pair of sheets, each sheet of the pair including an outer protective layer and an inner layer of a porous low-friction material and a spacing layer disposed between the inner surfaces of the respective outer layers of the cover and surrounding the respective inner layers of the cover, the disk being contained within a recess defined by the inner surface of the inner layer of each sheet and the surface of the spacing layer surrounding the inner layers.

In accordance with the foregoing object, it is a final object to provide a cover with an aperture disposed radially between the central opening and the magnetic disk and an outer edge of the cover to expose a portion of the disk record surface for contact with a magnetic transducer.

Further features of the invention pertain to the particular arrangement of the parts of the combination of the magnetic disk and the cover whereby the above-outlined and additional operating features thereof are attained.

The invention, both as to its organization and method of operation, together with further objects and advantages thereof will best be understood with reference to the following specification taken in connection with the accompanying drawings.

DESCRIPTION OF PREFERRED EMBODIMENT

Figure 1:
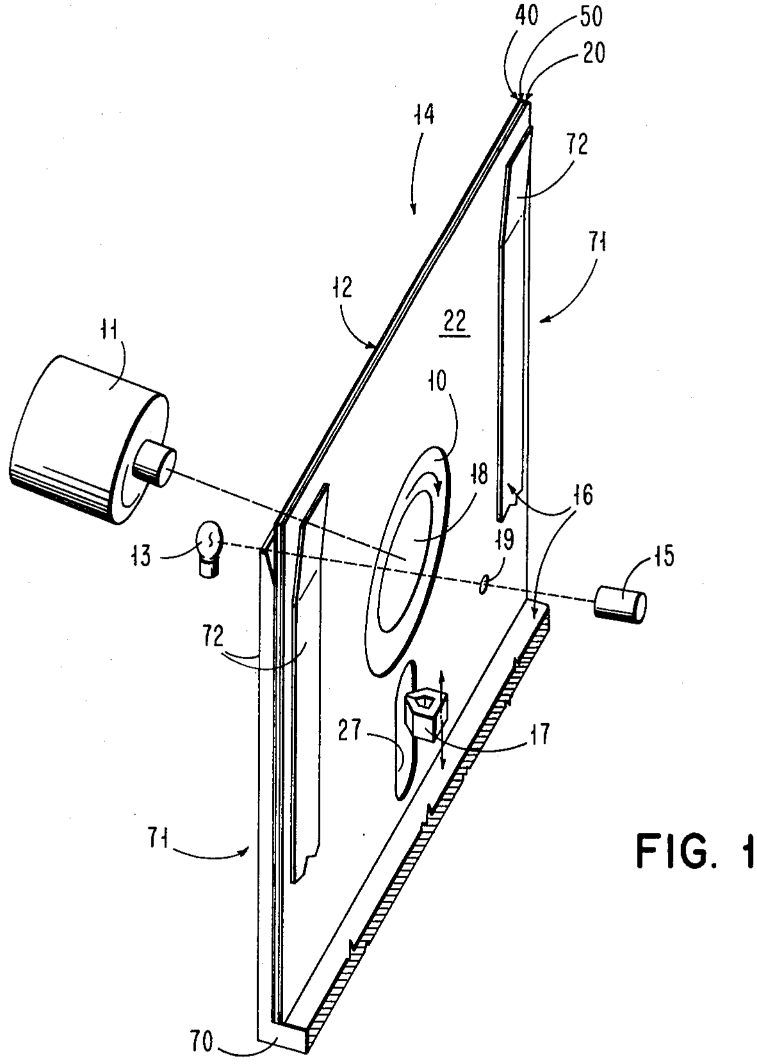
FIG. 1 is a perspective view of an embodiment of the combination of the magnetic record disk and the cover incorporating the features of the invention.

Referring now to the drawings and, more particularly, to FIG. 1 thereof, there is shown a magnetic record disk 10 which is contained within a cover 12, the combination of the disk 10 and the cover 12 being generally designated 14. The combination 14 is inserted in a disk guide 16 in a magnetic recording system (not shown).

Figure 2:
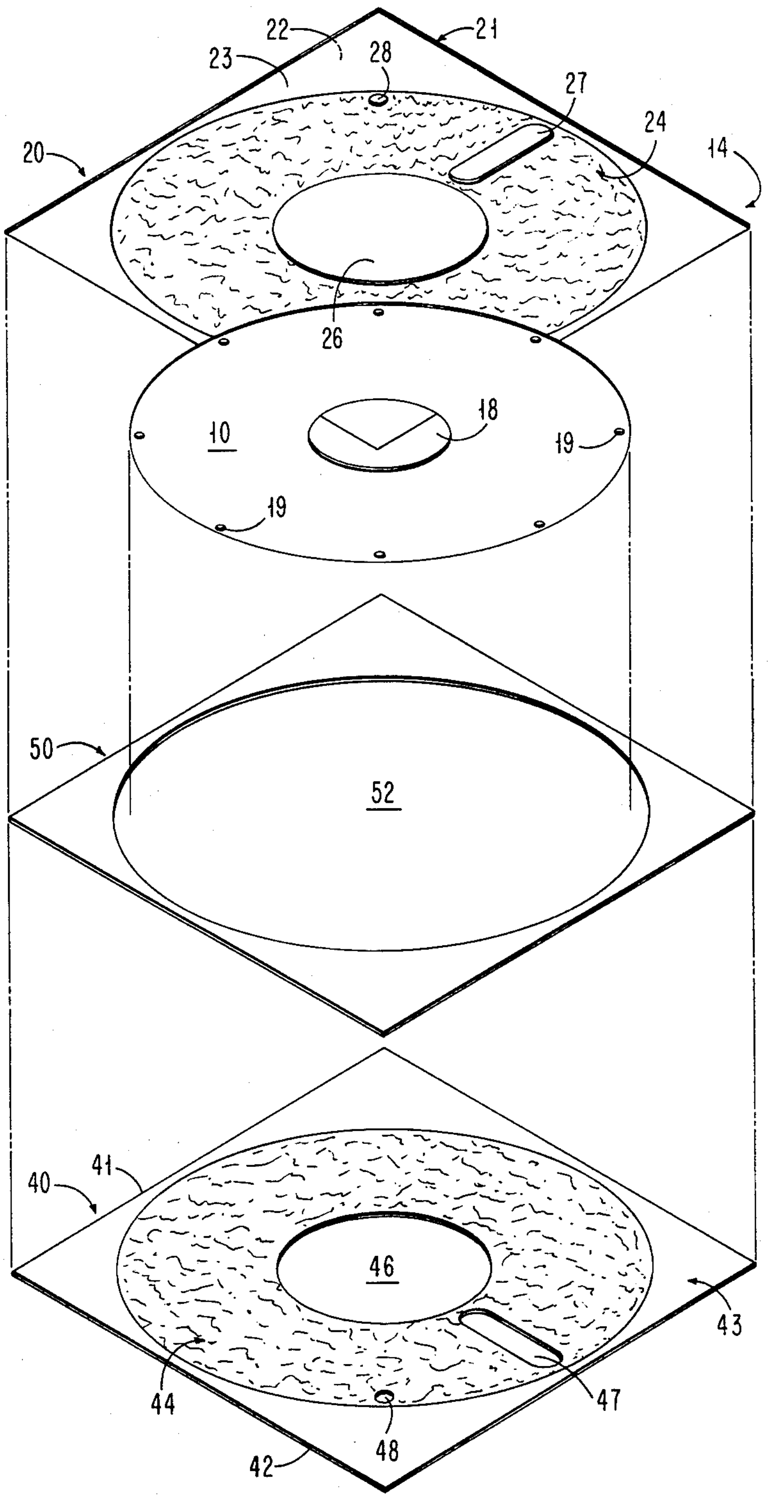
FIG. 2 is an exploded perspective view of the combination.

There is illustrated in FIG. 2 of the drawings an exploded perspective view of the combination 14 made in accordance with the present invention. The magnetic record disk 10 is a thin, flat, annularly shaped, flexible disk having a magnetic oxide coating on the flat record surfaces thereof. The record surfaces contain information magnetically stored thereon, the recording and the playing back of such information being well known in the art. The information is stored on a plurality of spaced-apart circular tracks. The disk 10 has a central aperture 18 and a plurality of sector apertures 19. More particularly, there are eight sector apertures 19, each of which is at the same radius from the center of the disk in the proximity of the outer circumference thereof. The aperture 19 are each circular and equally spaced from one another.

The cover 12 comprises a first sheet 20, a second sheet 40 and a spacing layer 50 disposed therebetween. The cover 12 has a square perimeter. The first sheet 20 comprises an outer layer 21 and an inner layer 24. The outer layer 21 is vinyl and has an outer surface 22 and an inner surface 23. The outer surface 22 is opaque and has a matted texture; and the inner surface 23 has a fine texture, appearing shiny to an observer, that will characteristically receive an adhesive material upon contact. The first sheet 20 has a circular, central aperture 26 and a transducer access aperture 27 and a sector-marking aperture 28. The central aperture 26 has a larger radius than that of the central aperture 18 of the disk 10. The transducer access aperture 27 has a generally oval shape and is disposed with its longitudinal axis directed radially from the center of the first sheet 20, so as to uncover portions of all the information carrying tracks of the disk 10. The sector-marking aperture 28 is circular and has a larger radius than the radius of the sector apertures 19 of the disk 10. In addition, aperture 28 is disposed at a radius from the center of the first sheet 20 that is less than the radius of the disk 10 so that when the disk 10 is disposed within the cover 12 the sector apertures 19 are aligned with sector-marking aperture 28.

The inner layer 24 of the first sheet 20 comprises a porous, low-friction, anti-static material. A particular material may be the dusting fabric which is manufactured by Minnesota Mining and Manufacturing Company and is designated 3M 550, generally known in the art as "pink wipe." The material allows the disk to be easily rotatable within the cover since the anti-static property prevents electrostatic charge that could be present on the sheets from adversely effecting the normally low frictional relationship between the material and the disk. The inner layer 24 has a generally annular shape with an inner circumference that coincides with the inner circumference of the first sheet 20 and a radius that is greater than the outer radius of the magnetic record disk 10.

The inner layer 24 is applied to the inner surface 23 of the outer layer 21. First, the inner surface 23 has an adhesive material, which may particularly be the material designated 3M 77 and manufactured by the Minnesota Mining and Manufacturing Company, applied thereto. Then, the porous, low-friction, anti-static dusting fabric inner layer 24 is sprayed or brushed on the inner surface 23, thereby to assume the applied form prescribed by the above-mentioned adhesive.

The second sheet 40 of the cover 12 is a mirror-image of the first sheet, and reference numerals in the 40 series have been applied to each feature corresponding to the reference numeral in the 20 series that was applied to the like feature of the first sheet 20 described above.

The spacing layer 50 has a square perimeter coterminous with the perimeter of the first sheet 20 and the second sheet 40. Spacing layer 50 is a vinyl material and has a circular aperture 52 cut therefrom of a radius greater than the outer radius of the magnetic record disk 10, whereby the disk 10 fits therewithin. The spacing layer 50 has a lateral thickness approximately the same as the thickness of disk 10. Attached to the outer surfaces of the spacing layer 50 is a double-sided tape for adhering the spacing layer 50 to the inner surface 23 of the first sheet 20 and the inner surface 43 of the second sheet 40 once the release paper is removed from the double-sided tape.

The combination 14 is assembled by taking the release paper off the double-sided tape on one surface of the spacing layer 50 and adhering the spacing layer to the inner surface 43 of the second sheet 40. The magnetic record disk 10 is then positioned within the circular aperture 52 of the spacing layer 50. The release paper is then removed from the second surface of the spacing layer 50 and the inner surface 23 of the first sheet 20 applied thereto, thereby to seal the disk 10 non-removably within the cover 12, in the recess defined by the inner layers 24 and 44 and the circular aperture 52 of the spacing layer 50. However, the disk 10 is rotatably movable within the cover 12. The assembled combination 14 of the disk 10 and the cover 12 is illustrated in FIG. 1. As illustrated, the inner layer 24 is in frictional and physical contact with the adjacent record surface of the disk 10. The spacing layer 50 permits the inner layers 24 to contact and wipe the record surfaces of the disk. If the layer 50 is not present the first sheet 20 and the second sheet 40 tend to warp away from the record surfaces, thereby to diminish the quality of the wipe of the record surfaces. However, it is possible to vacuum-form the sheets 20 and 40 with a disk-enclosing recess therebetween such that the spacing layer may not be necessary.

Reiterating, there has been described a cover 12 for containing a magnetic record disk 10. The cover 12 comprises a first sheet 20 and a second sheet 40 coterminous or congruent with the first sheet 20. The disk 10 is rotatable within the sheets, which sheets remain substantially stationary in use, as will be subsequently described. The inner layers 24 and 44 comprise a porous, low-friction, anti-static cleaning material and physically and frictionally contact an adjacent surface of the disk 10, whereby the inner layers 24 and 44 of the stationary sheets 20 and 40 respectively clean the adjacent surface of the contained rotary disk 10 upon rotation thereof. The low-friction material which comprises layers 24 and 44 prevents abrasion of the record surfaces of the disk 10. Furthermore, the cover 12 keeps dust and other contaminants from settling on the magnetic record surface and protects the magnetic record surface from being subjected to contamination during handling operations, while the inner layers 24 and 44 wipe the record surfaces clean from dust and wear products and airborne contaminants that may be present thereon.

As illustrated in FIG. 1, the invention is embodied in a magnetic recording system. The magnetic recording system comprises a rotary drive 11, a disk guide 16, a magnetic transducer 17, a light source 13 and a light sensor 15.

The rotary drive 11 is coupled to the central aperture 18 of the disk 10 and upon energization rotatably drives the disk 10. The magnetic transducer 17 or magnetic head is positioned adjacent the record surface of the magnetic record disk 10 within the transducer access aperture 27 in the first sheet of the cover 12. The transducer is radially movable (as shown by the arrows) for directly accessing different ones of the information-carrying tracks. The light source 13 is positioned outside the outer surface of the second sheet 40 and in lateral alignment with the lights sensor 15, which is generally a photocell, so that when the combination 14 is mounted in the disk guide 16, light from source 13 is received by sensor 15 through the sector-marking aperture 48 of the second sheet 40, the sector aperture 19 of the disk 10, and the sector-marking aperture 28 of the first sheet 20. If a transparent cover is utilized no sector-marking apertures are necessary since a light from source 13 could be sensed by sensor 15 whenever a sector aperture 19 of the disk 10 is positioned therebetween.

The disk guide 16 comprises a base 70 having a pair of holders 71 protruding upwardly therefrom. The holders 71 are longitudinally spaced apart a distance less than the length of one side of the square combination 14 so that the holders 71 can hold the combination 14 stationary therebetween. Each holder 71 comprises two laterally spaced-apart members 72 that have facing inner surfaces. The inner surfaces are spaced apart a distance slightly less than the lateral thickness of the cover 12 so that when the cover 12 is inserted between the members 72, it will be tightly held. The upper ends of the members are flared laterally outwardly so that the cover can be easily inserted. The disk guide 16 securely holds the combination 14 of the disk 10 within the cover 12 so that the cover 12 is maintained stationary in the magnetic recording system.

In a particular application, the disk 10 is inserted and sealed in the cover 12. The disk 10 is then prerecorded on one or both sides with a program for controlling an initial program load or for a microprogram storage backup or for a diagnostic microprogram storage. The recorded disk 10 within the cover 12 is then distributed to a user and the combination 14 thereof inserted in the disk guide 16 of the magnetic recording machine. The disk guide 16 holds the cover 12 stationary therein. The rotary drive 11, coupled to the central aperture 18 of the disk 10, rotates the disk and magnetic transducer 17 disposed adjacent the disk record surface within the transducer access aperture 27 receives the information contained on the disk. Compliance between the magnetic transducer 17 and the record surface may be increased by the inclusion of a pressure pad (not shown) disposed against the disk within the aperture 47 so as to force the record surface of the disk into a continuously contacting relation with the transducer 17. The pressure pad may be shaped so as to conform to the transducing surface of the transducer, although separated therefrom by the thickness of the record disk 10. In addition, a head load-unload pinch pad (not shown) may be utilized for pinching the outer surfaces of the inserted cover together so as to cause an additional cleaning action of the record surfaces by the inner layers 24.

When there is relative rotation between the cover and the record disk, any airborne particles or contaminants within the system that alight on the record surface are cleaned from the surface by the porous, low-friction, anti-static inner layer 24 of the first sheet 20 that is physically and frictionally in contact with the record surface. The maintainence contaminant-free record surfaces reduces errors due to "drop out."

The combination 14 herein described is lightweight, comparatively inexpensive to manufacture and yet rugged enough to withstand rough handling. In view of these quantities the combination may be enclosed in an envelope and transmitted via ordinary postal routes.

From the above, it will be seen that there has been provided a cover for maintaining the record surface of a magnetic disk enclosed therein free from contamination and which fulfills all of the objects and advantages set forth above.

While there has been described what is presently considered to be the preferred embodiment of the invention, it will be understood that various modifications may be made therein, and it is intended to cover in the appended claims all such modifications as fall within the true spirit and scope of the invention.

What is claimed is:

1. In a magnetic recording system, the combination comprising:
- a rotary magnetic record disk; and
- a cover for containing said disk, having the inner surfaces thereof in physical and frictional contact with the adjacent record surfaces of said disk,
- said inner surfaces being a solid, porous, antistatic cleaning material,
- said cover having a transducing aperture to expose a portion of said rotary magnetic record disk,
- said disk being rotatable while said cover is maintained stationary in the magnetic recording system,
- whereby said solid, porous material cleans contaminants from said record disk during rotation of said record disk.

2. The combination set forth in claim 1, further comprising means coupled to said disk for rotating said disk.

3. The combination set forth in claim 1, wherein the outer perimeter of said cover is sealed therearound thereby to enclose said disk nonremovably therefrom.

4. The combination set forth in claim 1, wherein said magnetic record disk includes a plurality of sector-marking apertures equally spaced circumferentially around said disk and at the same radial distance from the center of said disk, and wherein said cover includes a reference aperture disposed so that said apertures of said disk will be aligned therewith upon rotation of said disk.

5. The combination set forth in claim 1, wherein said cover comprises a pair of sheets, each sheet of said pair including an outer protective layer and an inner layer,
- said inner layer including said inner surface, and wherein said magnetic record disk has an opening centrally disposed therethrough, and
- wherein at least one of said pair of sheets has said transducing aperture therethrough disposed radially between said central opening in said magnetic disk and an outer edge of the sheet.

6. In a magnetic recording system having a rotary drive and a magnetic transducer, the combination comprising:
- a magnetic record disk having an opening centrally disposed therethrough for coupling the rotary drive thereto to enable said disk to be rotated by the rotary drive;
- a cover containing said record disk and having on its inner surface a solid, porous, antistatic low-friction cleaning material, said inner surface being in contact with the record surface of said record disk, said cover having a transducing aperture disposed radially between said central opening in said magnetic disk and an outer edge of said cover,
- thereby to expose a portion of said disk record surface for contact with the magnetic transducer,
- so that rotation of said record disk causes the inner surfaces of said cover to continuously clean the record surfaces of said record disk.

7. In a magnetic recording system as in claim 6, wherein said magnetic record disk includes a plurality of sector-marking apertures equally spaced circumferentially around said disk and at the same radial distance from the center of said disk, and wherein said cover includes a reference aperture disposed so that said apertures of said disk will be aligned therewith upon rotation of said disk.

* * * * *

Disclaimer 3,668,658.—*Ralph Flores*, San Jose, and *Herbert E. Thompson*, Santa Clara, Calif. MAGNETIC RECORD DISK COVER. Patent dated June 6, 1972. Disclaimer filed June 7, 1976, by the assignee, *International Business Machines Corporation*.

Hereby enters this disclaimer to claim 2 of said patent.

[*Official Gazette August 17, 1976.*]